US009955527B2

United States Patent
Uchida et al.

(10) Patent No.: US 9,955,527 B2
(45) Date of Patent: Apr. 24, 2018

(54) RECORDER

(71) Applicant: YOKOGAWA ELECTRIC CORPORATION, Tokyo (JP)

(72) Inventors: Masayuki Uchida, Tokyo (JP); Tatsuya Fukuhara, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 80 days.

(21) Appl. No.: 14/921,113

(22) Filed: Oct. 23, 2015

(65) Prior Publication Data

US 2016/0135249 A1 May 12, 2016

(30) Foreign Application Priority Data

Nov. 6, 2014 (JP) .................................. 2014-225699

(51) Int. Cl.
| | |
|---|---|
| *H04Q 7/00* | (2006.01) |
| *H04W 88/16* | (2009.01) |
| *H04L 29/08* | (2006.01) |
| *H04W 80/06* | (2009.01) |
| *G05B 19/418* | (2006.01) |
| *H04W 88/02* | (2009.01) |

(52) U.S. Cl.
CPC ........ *H04W 88/16* (2013.01); *G05B 19/4186* (2013.01); *H04L 67/12* (2013.01); *H04W 80/06* (2013.01); *G05B 2219/31093* (2013.01); *G05B 2219/31131* (2013.01); *G05B 2219/31162* (2013.01); *H04W 88/02* (2013.01)

(58) Field of Classification Search
CPC ..... H04W 88/16; H04W 80/06; H04W 88/02; G05B 19/4186; G05B 2219/31162; G05B 2219/31093; G05B 2219/31131; H04L 67/12
USPC ......................................... 370/328, 338, 311
See application file for complete search history.

(56) References Cited

U.S. PATENT DOCUMENTS

| | | | | |
|---|---|---|---|---|
| 2007/0280144 A1* | 12/2007 | Hodson | .............. | G05B 19/4185 370/312 |
| 2008/0273486 A1* | 11/2008 | Pratt | ..................... | H04L 12/403 370/328 |
| 2008/0274766 A1* | 11/2008 | Pratt | ..................... | G01D 21/00 455/552.1 |
| 2009/0010203 A1* | 1/2009 | Pratt, Jr. | ................. | H04L 12/66 370/328 |

(Continued)

FOREIGN PATENT DOCUMENTS

| | | |
|---|---|---|
| JP | 11-118530 A | 4/1999 |
| JP | 2006318148 A | 11/2006 |

(Continued)

*Primary Examiner* — Chuong T Ho
(74) *Attorney, Agent, or Firm* — Sughrue Mion, PLLC

(57) ABSTRACT

A recorder includes a wireless gateway unit built in the recorder, the wireless gateway unit being configured to wirelessly communicate with a field device, the wireless gateway unit converting between an internal communication protocol used for the internal communication of the recorder and a protocol used for the wireless communication. The recorder may further include a control unit that processes data from the field device. The wireless gateway unit is configured to internally communicate with the control unit. The wireless gateway unit collects the data from the field device to transmit to the control unit.

3 Claims, 4 Drawing Sheets

(56) References Cited

U.S. PATENT DOCUMENTS

| | | | |
|---|---|---|---|
| 2009/0010233 A1* | 1/2009 | Pratt, Jr. | G01D 21/00 370/338 |
| 2009/0097502 A1 | 4/2009 | Yamamoto | |
| 2010/0106860 A1* | 4/2010 | Li | H04L 12/2834 709/250 |
| 2010/0110916 A1 | 5/2010 | Pratt, Jr. et al. | |
| 2012/0038458 A1 | 2/2012 | Toepke et al. | |
| 2012/0038760 A1 | 2/2012 | Kantzes et al. | |
| 2012/0040316 A1 | 2/2012 | Mathiowetz et al. | |
| 2012/0040698 A1 | 2/2012 | Ferguson et al. | |
| 2012/0041744 A1 | 2/2012 | Kantzes et al. | |
| 2012/0046911 A1 | 2/2012 | Mathiowetz et al. | |
| 2013/0188557 A1* | 7/2013 | Gotou | H04L 67/36 370/328 |
| 2013/0223315 A1* | 8/2013 | Yoshida | H04W 52/0206 370/311 |
| 2013/0227575 A1 | 8/2013 | Jensen et al. | |
| 2014/0035607 A1 | 2/2014 | Heydron et al. | |
| 2016/0198388 A1* | 7/2016 | Greene | H04Q 9/00 370/338 |

FOREIGN PATENT DOCUMENTS

| | | |
|---|---|---|
| JP | 2014032677 A | 2/2014 |
| WO | 2012/016014 A1 | 2/2012 |

* cited by examiner

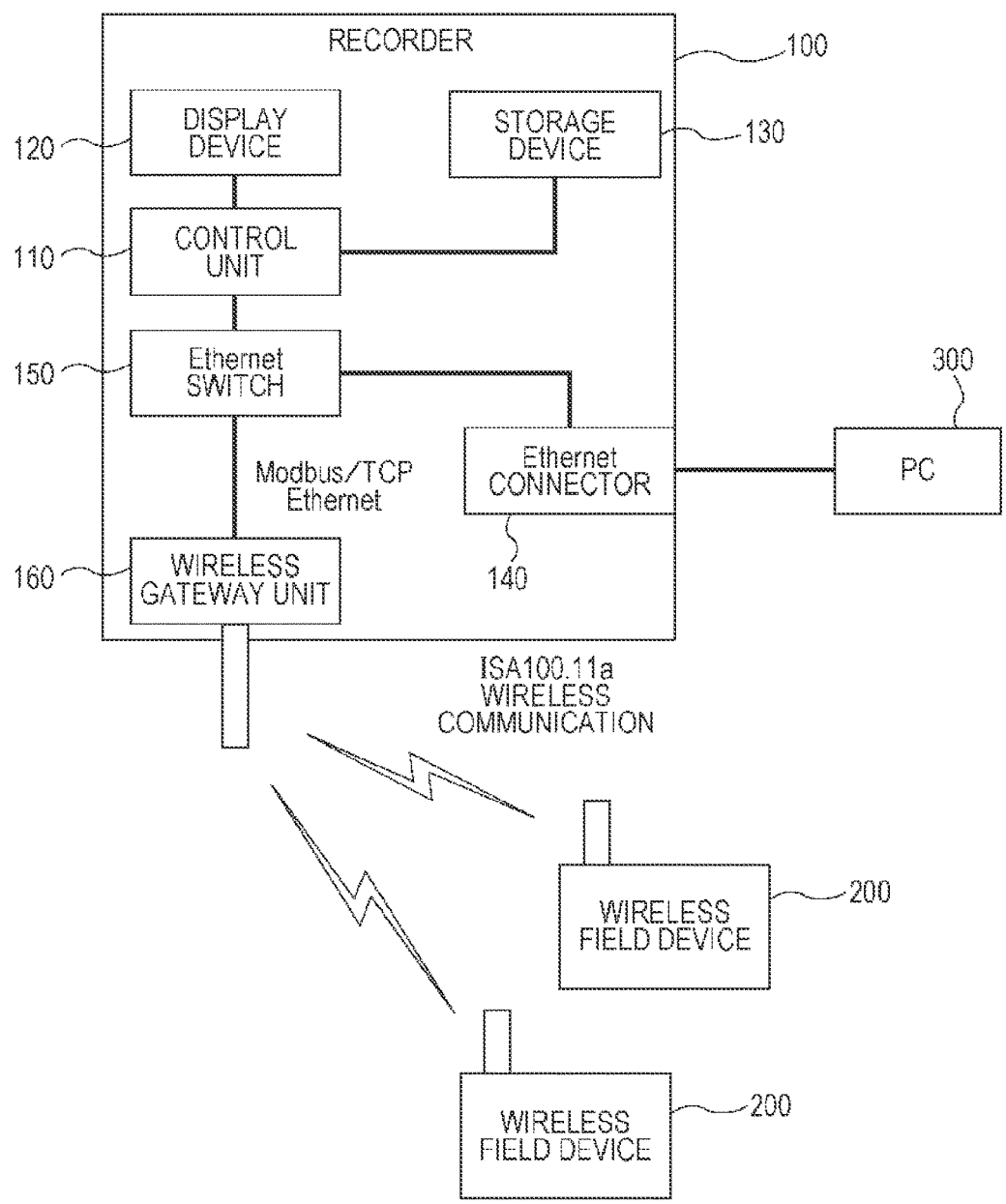

RECORDER

CROSS-REFERENCE TO RELATED APPLICATION

This application claims priority from Japanese Patent Application No. 2014-225699 filed with the Japan Patent Office on Nov. 6, 2014, the entire content of which is hereby incorporated by reference.

BACKGROUND

1. Technical Field

The present disclosure relates to a recorder.

2. Description of the Related Art

A recorder is a device that collects data from a field device such as a differential pressure transmitter, a temperature transmitter, and a flowmeter to perform recording, displaying waveform, or the like. Formerly, wired communication has been used for a communication between the recorder and the field device. Recently, wireless communication is also used.

When the recorder wirelessly communicates with the field device (a wireless field device), the wireless field device includes a built-in wireless function, or is coupled to a wireless communication module. A recorder 500, for example, as shown in FIG. 3, is coupled by wire to a wireless gateway device 600 via an Ethernet (registered trademark) or the like. The recorder 500 wirelessly communicates with a wireless field device 610 via the wireless gateway device 600.

Here, the wireless gateway device 600 converts between a protocol such as Modbus/TCP used for the communication with the recorder 500 and a wireless protocol such as ISA100.11a used for the wireless communication with the wireless field device 610. Furthermore, the wireless gateway device 600 is wirelessly coupled to the wireless field device 610, collects data on which the wireless field device 610 performed measurement or the like, and transmits the data to the recorder 500.

Alternatively, as shown in FIG. 4, an access point 602 may be used. The access point 602 is coupled by wire to a gateway device 601. The access point 602 wirelessly communicates with the wireless field device 610.

In this case, the gateway device 601 converts between the protocol such as Modbus/TCP and an original protocol such as a field wireless backbone. The access point 602 is wirelessly coupled to the wireless field device 610.

In any configuration, the recorder 500 functions as a host to collect the data on which the wireless field device 610 performs measurement or the like, via the wireless gateway device 600 or via the access point 602 and the gateway device 601. The recorder 500 records the collected data and performs the waveform display, the numerical value display or the like as necessary.

The technique in this field is disclosed, for example, on JP-A-11-118530.

SUMMARY

A recorder includes a wireless gateway unit built in the recorder, the wireless gateway unit being configured to wirelessly communicate with a field device, the wireless gateway unit converting between an internal communication protocol used for the internal communication of the recorder and a protocol used for the wireless communication.

BRIEF DESCRIPTION OF THE DRAWINGS

FIG. 1 is a block diagram showing a configuration of a recorder according to the embodiment;

DESCRIPTION OF THE EMBODIMENTS

Figure 2A:
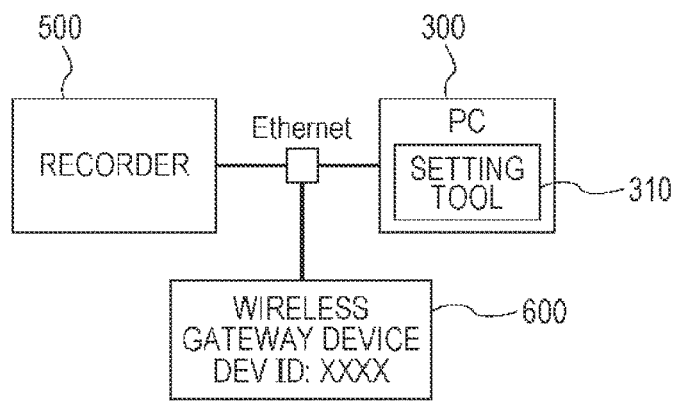
FIG. 2A is a drawing indicating a known device identifier set in a device.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 3:
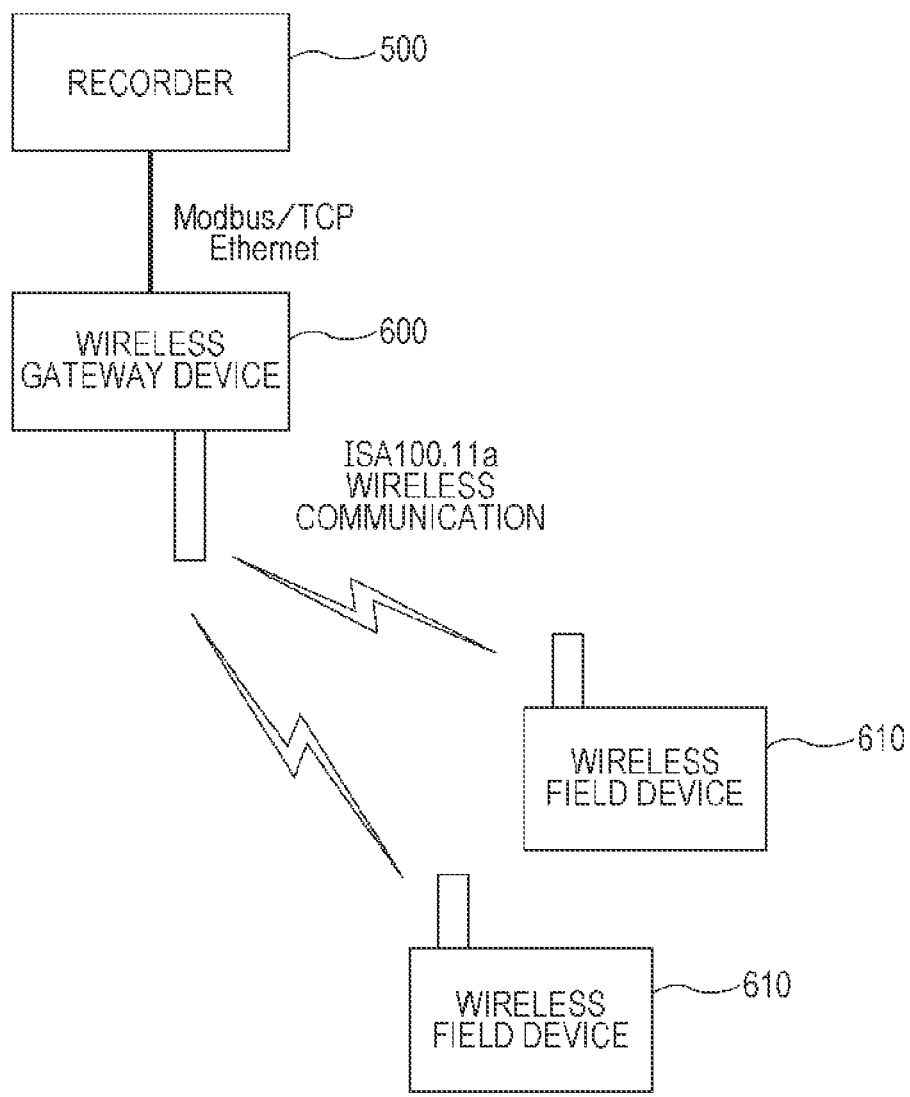
FIG. 3 shows an exemplary known communication between the recorder and a wireless field device.
Figure 4:
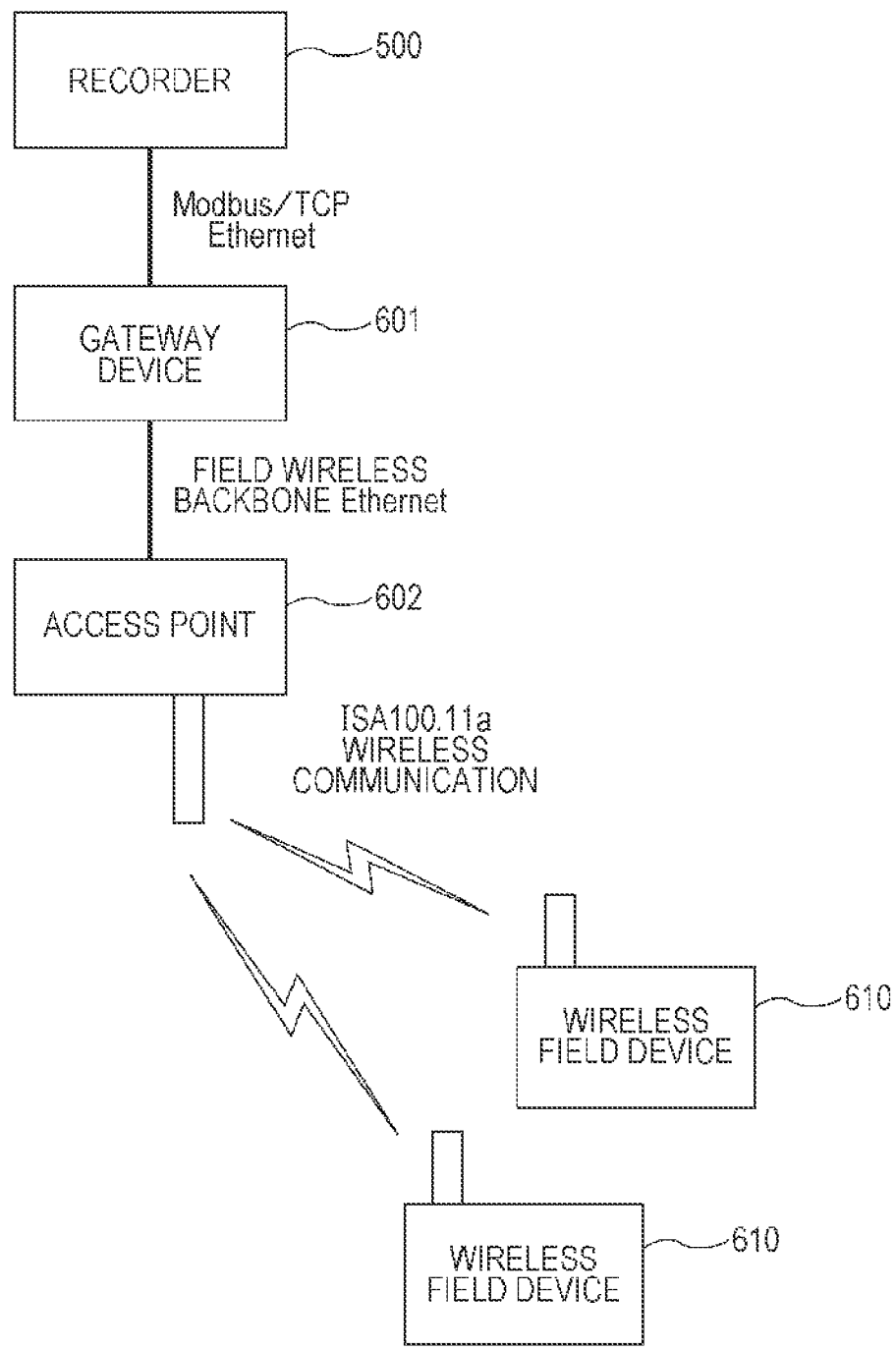
FIG. 4 shows another exemplary known communication between the recorder and the wireless field device.

As shown in FIGS. 3 and 4, the wireless gateway device 600, the gateway device 601, and the access point 602 are used for the communication between the recorder 500 and the wireless field device 610. These devices are originally assumed to be used in a large scale wireless network built at a plant or the like.

In view of this, the wireless gateway device 600, the gateway device 601, and the access point 602 are not necessarily appropriate to a small scale wireless network system with the recorder as the host. The wireless gateway device 600, the gateway device 601, and the access point 602 are used for, for example, a system that has a large scale structure with robustness and/or sealability or the like to satisfy an explosion-proof standard, and a system for which it is difficult to use a commercial power supply as it is because employing the two lines transmission system standard makes the operating power supply 24V DC.

The small scale network with the recorder as the host preferably has a simple configuration appropriate to its scale.

One object of the present disclosure is to provide a recorder that ensures to easily establish a small scale wireless network with the recorder as the host.

A recorder according to one embodiment of the present disclosure (the recorder) includes a wireless gateway unit built in the recorder, the wireless gateway unit being configured to wirelessly communicate with a field device, the wireless gateway unit converting between an internal communication protocol used for the internal communication of the recorder and a protocol used for the wireless communication.

The recorder may further include a control unit that processes data from the field device. The wireless gateway unit may be configured to internally communicate with the control unit. The wireless gateway unit may collect the data from the field device to transmit to the control unit.

In the recorder, the wireless gateway unit may have a device identifier for identifying the wireless gateway unit by the control unit.

The recorder can easily establish the small scale wireless network with the recorder as the host.

A description will be given of one embodiment of the present disclosure with referring to the drawings. FIG. 1 is a block diagram showing the configuration of a recorder 100 according to the embodiment. The recorder 100 collects data from a wireless field device (field device) 200, and, for example, records the data, and/or, displays a waveform based on the data. The recorder 100 can also perform management recording in a manufacturing process of a product based on the collected data. The wireless field device 200 includes, for example, a differential pressure transmitter, a temperature transmitter, and a flowmeter.

In the embodiment, the recorder 100 functions as a host of, for example, a small scale network. The wireless field device 200 may include a built-in wireless function, or may be coupled to a wireless communication module. The recorder 100 wirelessly communicates with the wireless field device 200 using a wireless protocol of ISA100.11a. However, the wireless protocol may be other wireless protocol such as WirelessHART.

As shown in FIG. 1, the recorder 100 includes a control unit 110, a display device 120, a storage device 130, an Ethernet connector 140, an Ethernet switch 150, and a wireless gateway unit 160.

The control unit 110 controls various processes in the recorder 100. The control unit 110 processes, for example, the data collected from the wireless field device 200. The display device 120 displays a waveform or the like. When the recorder 100 is a recorder such as a data logger that is configured to collect and record the data but not to display the waveform, the recorder 100 may not include the display device 120. The storage device 130 stores the data collected from the field device and various setting.

The Ethernet connector 140 is coupled to a PC 300 and the like via Ethernet and communicates with the PC 300 and the like using TCP/IP or the like. In the PC 300, a setting tool corresponding to the recorder 100 is installed. This ensures the PC 300 to set, for example, various parameters of the recorder 100. The Ethernet switch 150 relays communication data among the control unit (for example, a CPU) 110, the Ethernet connector 140, and the wireless gateway unit 160.

The recorder 100 uses the protocol (internal communication protocol) such as Modbus/TCP for an internal communication (for example, wired communication). On the other hand, the recorder 100 uses the wireless protocol such as ISA100.11a for the wireless communication between the recorder 100 (the wireless gateway unit 160) and the wireless field device 200.

The wireless gateway unit 160 is built in the recorder 100. The wireless gateway unit 160 internally communicates with the control unit 110 via the Ethernet switch 150. Furthermore, the wireless gateway unit 160 is wirelessly coupled to the wireless field device 200. Namely, the wireless gateway unit 160 wirelessly communicates with the wireless field device 200.

The wireless gateway unit 160 converts between the internal communication protocol used for the internal communication of the recorder 100 (for example, the communication between the wireless gateway unit 160 and the control unit 110) and the wireless protocol used for the wireless communication with the wireless gateway unit 160.

The wireless gateway unit 160 collects the data on which the wireless field device 200 performed measurement or the like and transmits the data to the control unit 110 via the Ethernet switch 150. The control unit 110 records the data collected from the wireless field device 200 in the storage device 130. The control unit 110, for example, processes the data and displays the waveform and/or the numerical value or the like relating to the data on the display device 120.

The wireless gateway unit 160 (the recorder 100) may include an antenna mechanism for the wireless communication. As shown in FIG. 1, the antenna mechanism may be, for example, a part of the wireless gateway unit 160 projecting from the recorder 100.

Thus, the recorder 100 of the embodiment includes the built-in wireless gateway unit 160. This ensures the recorder 100 to wirelessly communicate with the wireless field device 200 directly without preparing a wireless gateway device additionally and preparing a 24V DC power supply. In view of this, the recorder 100 can easily establish the small scale network with the recorder 100 as the host. Namely, the recorder 100 has the configuration appropriate to such a small scale network.

The recorder 100 of the embodiment can be moved easily because the recorder 100 includes the built-in wireless gateway unit 160. Accordingly, the recorder 100 is also appropriate to the use that the place for use of the recorder 100 is changed at any time. The appearance of the recorder 100 of the embodiment may be similar to the known recorder 500 (see FIG. 3) except the antenna mechanism for the wireless communication, for example.

By the way, as shown in FIG. 2A, there is a case where the wireless gateway device 600 is coupled to the known recorder 500 via the Ethernet. In this case, the user preliminarily sets the device identifier of the wireless gateway device 600 using the PC 300 in which a setting tool 310 is installed. Here, the device identifier is a name allocated to the device for identifying the device (the wireless gateway device 600) by the control unit 110. As the device identifier, any unique name such as "DEVID: xxxx" can be set.

Figure 2B:
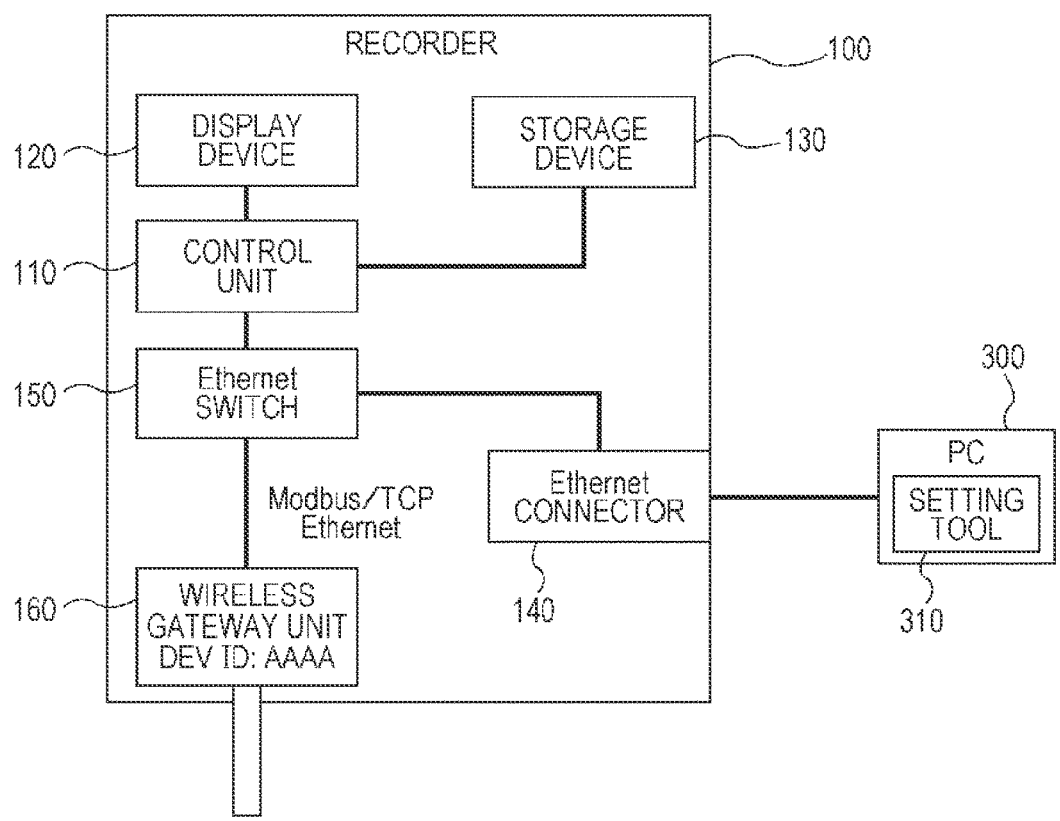
FIG. 2B is a drawing indicating a device identifier set in a device in the recorder according to the embodiment.

In contrast to this, in the recorder 100 of the embodiment shown in FIG. 2B, the default device identifier such as "DEVID: AAAA" is set in the wireless gateway unit 160 at the initial state. Namely, the wireless gateway unit 160 has the device identifier for identifying the wireless gateway unit 160 by the control unit 110, for example, at the initial state. This ensures the user to save the labor to set the device identifier. The user can change the default device identifier to an arbitrary name using the PC 300 in which the setting tool 310 is installed.

The embodiment of the present disclosure also relates to a recorder that collects data from a field device such as a differential pressure transmitter and a temperature transmitter to perform recording, displaying waveform, or the like. One object of the embodiment may be realizing to easily establish a small scale wireless network with a recorder as a host.

The recorder 100 can wirelessly communicate with the wireless field device 200 directly without preparing a wireless gateway device additionally and preparing a 24V DC power supply because the recorder 100 includes the built-in wireless gateway unit 160. In view of this, the embodiment of the present disclosure can establish a simple configuration appropriate to the small scale network with the recorder 100 as the host.

The recorder according to the embodiment may be the following first or second recorder.

The first recorder is a recorder that collects data from a field device for the wireless communication, including a wireless gateway unit to convert between the protocol used for the communication inside the recorder and the protocol of the wireless communication, and to be wirelessly coupled to the field device.

In the second recorder according to the first recorder, a device identifier of the wireless gateway unit is already set at the initial state.

The first or the second recorder can easily establish a small scale wireless network with a recorder as a host.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A recorder, comprising:
   a controller configured to collect data from a field device configured to make a wireless communication via a repeater designed to satisfy an explosion-proof standard, the controller further configured to display on a display a waveform generated based on the collected data;
   a wireless gateway wirelessly connected with the field device and configured to convert a wireless protocol used for the wireless communication of the field device into an internal communication protocol used for an internal communication of the recorder;
   an ethernet connector coupled by wire to an external terminal device for use for parameter setting of the recorder so as to communicate with the external device; and
   an ethernet switch built in the recorder and configured to relay communication data received from the wireless gateway to the controller,
   wherein, the ethernet switch is also configured to relay communication data between the controller and the external terminal device for the parameter setting, and
   the wireless protocol is either ISA100.11a or wirelessHART.

2. The recorder according to claim 1, wherein a device identifier of the wireless gateway is already set in an initial state.

3. The recorder according to claim 1,
   wherein the controller is further configured to process measurement data that is measured by the field device,
   wherein the wireless gateway is further configured to internally communicate with the controller,
   wherein the wireless gateway is further configured to collect the measurement data from the field device to transmit to the controller, and
   wherein the wireless gateway has a device identifier for identifying the wireless gateway by the controller.

* * * * *